(12) United States Patent
Miller et al.

(10) Patent No.: US 9,591,215 B1
(45) Date of Patent: Mar. 7, 2017

(54) THERMALLY CONDUCTIVE CAMERA ENCLOSURE

(71) Applicant: Apple Inc., Cupertino, CA (US)

(72) Inventors: Scott W. Miller, Los Gatos, CA (US); Ihtesham H. Chowdhury, Los Altos, CA (US); Ryan J. Dunn, San Francisco, CA (US); Jeffrey Nathan Gleason, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/852,336

(22) Filed: Sep. 11, 2015

(51) Int. Cl.
*H04N 5/232* (2006.01)
*H04N 5/225* (2006.01)

(52) U.S. Cl.
CPC ....... *H04N 5/23241* (2013.01); *H04N 5/2252* (2013.01); *H04N 5/2253* (2013.01); *H04N 5/2254* (2013.01)

(58) Field of Classification Search
CPC ............. H01L 24/29; H01L 29/83; H01L 2224/29339; H01L 2224/29101; H01L 2224/2929; H01L 2224/2919; H01L 2224/29198; H01L 2224/83191; H01L 2224/83192; H01L 2224/83855; H01L 2224/29; H01L 2924/014; H01L 2924/01029; H01L 2924/00014; H01L 2924/00; H01L 2924/0132; H01L 2924/0665; H01L 2924/15747; H01L 2924/10253; H01L 2924/00013; H01L 2924/01023; H01L 2924/01033; H01L 2924/01006; H01L 2924/01019; H01L 2924/01005; H01L 2924/01013; H01L 2924/01015; H01L 2924/01016; H01L 2924/01018; H01L 2924/01027; H01L 2924/01032; H01L 2924/01038;
(Continued)

(56) References Cited

U.S. PATENT DOCUMENTS 7,851,930 B1 12/2010 Gupta
9,184,112 B1 * 11/2015 Gambino ................ H01L 23/58
(Continued)

OTHER PUBLICATIONS

Copper Development Assoc Inc., "C64800 Alloy", http://alloys.copper.org/alloy/C64800?referrer=facetedsearch, (2015), 2 pages.

*Primary Examiner* — Pritham Prabhakher
(74) *Attorney, Agent, or Firm* — Blakely, Sokoloff, Taylor & Zafman LLP

(57) ABSTRACT

Embodiments of the invention include devices, systems and methods for using or manufacturing a camera enclosure or mobile device that includes a thermally conductive camera module, such as having a minimum thermal conductivity of 200 watts per meter Kelvin (W/mK), that enhances heat transfer between a stiffener and cap of the enclosure. This allows heat produced by the camera to be conducted forward, away from the bottom of the stiffener, through the stiffener, and to the top of can so that the bottom of the stiffener does not heat to a high temperature, components of the device or an outer surface of a cover of the device near the bottom of the stiffener. This substantially increases the time before or avoids having the temperature of outer surface reach a high temperature, such as one that will be uncomfortable to the user. Other embodiments are also described and claimed.

22 Claims, 7 Drawing Sheets

(58) Field of Classification Search
CPC . H01L 2924/01047; H01L 2924/01074; H01L 2924/01077; H01L 2924/01079; H01L 2924/01082; H01L 2924/07802; H01L 2924/1461; H01L 27/14634; H01L 27/1469; H01L 27/1467; H01L 27/14685; H01L 27/14629; H04N 5/23241; H04N 5/2252; H04N 5/2253; H04N 5/2254
USPC ........................................................ 348/374
See application file for complete search history.

(56) References Cited

U.S. PATENT DOCUMENTS

| | | | | |
|---|---|---|---|---|
| 9,473,682 | B2* | 10/2016 | Koppetz | H04N 5/2252 |
| 2011/0234892 | A1* | 9/2011 | Yasuda | G03B 17/02 |
| | | | | 348/374 |
| 2014/0104479 | A1* | 4/2014 | Samuels | H04N 5/2254 |
| | | | | 348/335 |
| 2015/0001659 | A1 | 1/2015 | Le Neel et al. | |
| 2015/0070574 | A1* | 3/2015 | Koppetz | H04N 5/2252 |
| | | | | 348/373 |
| 2015/0350500 | A1* | 12/2015 | Gutierrez | H04N 5/2253 |
| | | | | 348/374 |
| 2016/0170454 | A1* | 6/2016 | Aurongzeb | G06F 1/20 |
| | | | | 361/679.47 |

\* cited by examiner

THERMALLY CONDUCTIVE CAMERA ENCLOSURE

FIELD

An embodiment of the invention is related to a technique for managing thermal or power dissipation concerns in a camera enclosure that has a rear portion which heats a surface or cover of the electronic device in which the camera module is mounted to exceed a given temperature. Other embodiments are also described.

BACKGROUND

Currently, a wide range of portable consumer electronics (e.g., mobile electronic devices) that are not dedicated to still or video imaging provide increasingly important imaging capabilities. These portable consumer electronics may include, for example, smart phones, laptops, notebooks, tablet computers, and camcorders. These portable consumer electronics are often constrained in both x-y area and z-height or thickness such that the camera included therein must be designed to meet the sizing constraints while providing adequate still and video image quality. Such a camera may be mounted in a module (or assembly) referred to as a "micro" camera module. The micro camera module may have a camera enclosure housing a camera with a front portion having a lens oriented towards a front opening in a front portion of the enclosure through which the camera takes images. The opening may be covered by a transparent camera cover.

Typically, a camera module in a portable consumer electronic device includes heat generating components such as an image sensor and one or more motor drivers for voice coil motors. These components may be mounted on or close to the rear portion of the camera module.

SUMMARY

Embodiments described herein are devices, systems and methods for improving the handling of power dissipation in a camera module, such as by using a camera module that has a highly thermally conductive camera enclosure to increase the amount of heat (e.g., "thermal energy") that is transferred from the rear portion of the camera enclosure where the camera which is creating heat is mounted, to the front portion of the enclosure. By transferring the heat, a surface of a device in which the module is mounted, that is near the rear portion, will not reach or will take substantially longer to reach a high temperature. That is, more heat is transferred forward to the front portion of the enclosure; and less heat is transferred rearward from the bottom of the enclosure and towards the surface of the device.

Some embodiments of the invention include a camera module of a portable (e.g., mobile) electronic device having a camera enclosure with a "stiffener" or rear housing upon which a camera is mounted and a "can" or front housing having an opening through which the camera takes images. Sides of a lower portion of the can are attached to sides of an upper portion of the stiffener. The stiffener and can are formed of one or more materials that not only meet the other requirements for the enclosure (e.g., physical requirements such as yield strength and elongation thresholds) but are also highly thermally conductive materials, such as by having a minimum thermal conductivity of 200 watts per meter Kelvin (W/mK). Due to the high thermal conductivity of the materials, heat produced at the bottom of the camera is conducted forward, through the stiffener and towards the top of the can so that the bottom of the stiffener does not heat to, or takes substantially longer to heat to, a "high" temperature, components of the device or a surface of the device near the bottom of the stiffener, such as during use of the camera. This avoids components of the camera or device exceeding a given temperature, at which they may become damaged; or the outer surface exceeding a given temperature at which it may become uncomfortable when placed against the user's skin. This can be especially important in smaller portable consumer electronic devices having a high density of electronic circuitry, such as smart phones.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
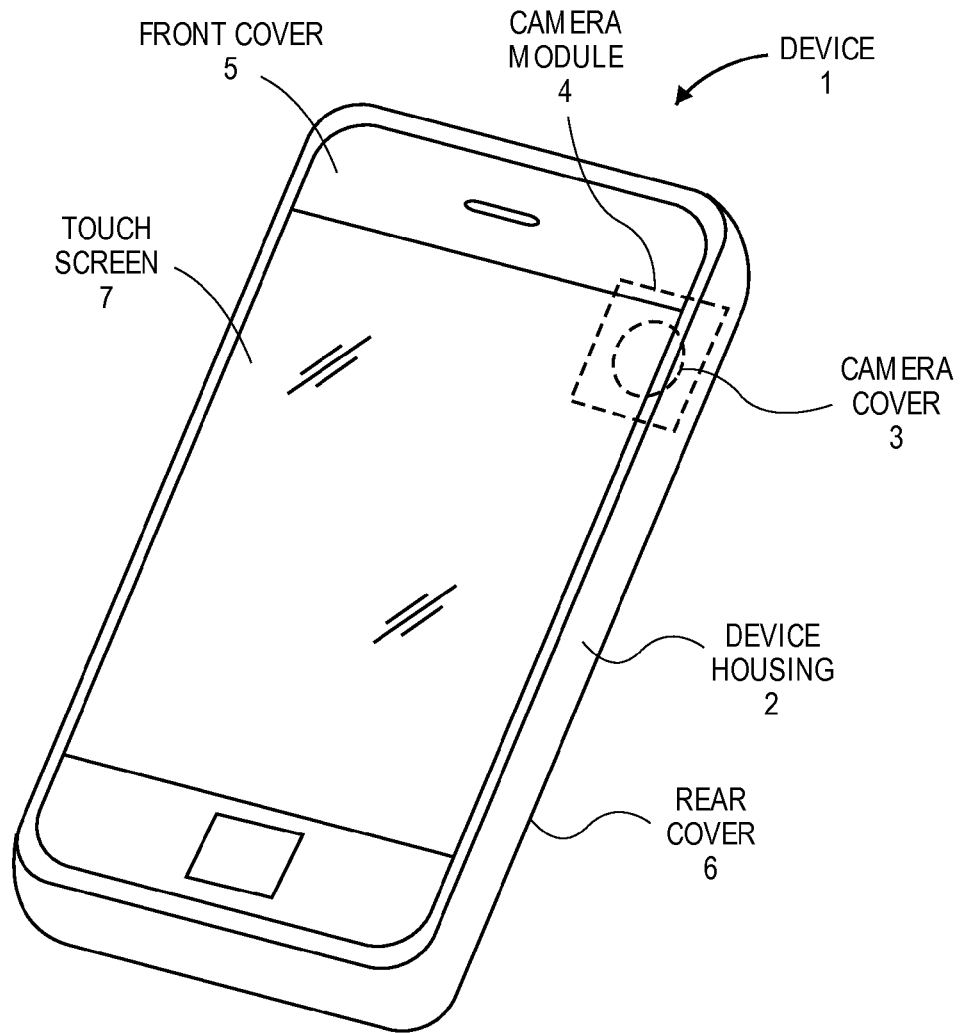
FIG. 1 illustrates one example of a portable consumer electronic device that is constrained in size and thickness and typically uses "micro" camera modules in which embodiments of the invention may be implemented.

FIG. 1 illustrates one example of a portable consumer electronic device (or "mobile device") 1 that may be constrained in size and thickness and typically uses one or more camera modules (such as camera module 4) in which embodiments of the invention may be implemented. As shown in FIG. 1, the mobile device 1 may be a mobile telephone communications device or a smartphone such as an iPhone™ device, from Apple Inc. of Cupertino, Calif. The mobile device 1 may also be a tablet computer such as an iPad™ device, a personal digital media player such an iPod™ device or a notebook computer such as a MacBook Air™ device, which are all from Apple Inc. of Cupertino, Calif. (e.g., also see FIG. 6). The device housing 2 (also referred to as the external housing) encloses a plurality of electronic components of the device 1 and may have a number of openings through the housing and covers over portions of the housing.

Housing 2 includes front cover 5 forming a front of the device and rear cover 6 forming a rear of the device. The front cover may include user touch screen 7 for receiving user inputs, displaying information and displaying images. Housing 2 encloses camera module 4 having a camera front portion with camera cover 3 (e.g., a transparent or clear plastic or glass cover) that may be located on or be part of rear cover 6. It is worth noting that for "rear facing" camera module 4 (e.g., module 4 as shown, which takes images of what is beyond or behind the rear outer surface of rear cover 6 of device 1), the rear of module 4 is facing (e.g., oriented or disposed) towards the front of device 1; while the front of module 4 is facing towards the rear of device 1.

It is considered that module 4 may be located at different locations or have different orientations than that shown in FIG. 1. For example, module 4 may be located at (and have cover 3 on) a different location along the rear cover 6 or may be located on front cover 5. In some cases, device 1 many include two or more of module 4. In some cases, two of module 4 may be oriented so that one of their covers is located on rear cover 6 and the other is located on front cover 5 of device, such as to provide cameras to take images to the rear and to the front of device 1. It can be appreciated that descriptions herein with respect to "rear facing" module 4 (e.g., as shown) can apply to camera module(s) 4 at these other locations.

Device 1 may also include electronic components such as a processor, a data storage containing an operating system and application software for execution by the processor, a display panel, an image processor for processing images created by module 4 and a camera control processor for providing control signals to sensors, motors, etc. of module 4 (e.g., through flex board 16 described herein). While FIG. 1 illustrates a mobile device 1, it is understood that embodiments of the invention may also be implemented in a non-mobile device such as a compact desktop computer such as an iMac™, from Apple Inc. of Cupertino, Calif.

The camera module 4 possesses inherent limitations, such as due to its reduced size in the case of a micro camera. These limitations are of special concern when considering maximum use or image rate metrics (e.g., during repetitive, rapid shot or video imaging). In a typical hand held or portable electronic device design, such as device 1, the camera cooling response is space-limited and the components of the device may be temperature-limited. Due such limitations, components of module 4 may create an amount of heat that causes certain components of the camera or of the device exceed the given (e.g., a "high" or desired) temperature, i.e., become too hot during camera use. In some case, there is a maximum temperature that surfaces of cover 5 or 6 of the device increase to before they become a "high" temperature, such as by being at a high enough temperature to be uncomfortable to the user, especially when placed against the user's skin; or to create a "hot spot" on a surface of the device. A high temperature may also be a temperature which would damage cover 5 or 6; or material upon which the cover or device set or sitting. A high temperature may also be a temperature, which would cause components of the camera or device to become damaged.

In some cases, for a "rear facing" camera module, the image sensor of the camera is at the rear portion of the camera module 4 and is located adjacent to the product front cover 5 (e.g., front glass or touch screen). Higher megapixel image sensors dissipate more thermal energy (e.g., "heat"), leading to increased temperature at the image sensor during use, including additional increases during rapid shot use. Some cameras may also employ Video imaging and/or optical image stabilization (OIS) modes, which dissipate additional thermal energy at the motor drivers for voice coil motors during use. These drivers may also be located at the rear portion of the camera module 4. Consequently, these thermal energies may be thermally conducted rearward, through the bottom (e.g., back of the rear portion) of the module and into the front cover 5, thus heating cover 5 to a "high" temperature.

One strategy for addressing these (e.g., "high") temperature limitations is to implement a camera module (e.g., module 4) having a high (e.g., highly) thermally conductive camera enclosure, such as an enclosure that includes or is formed of at least one highly thermally conductive material (e.g., enclosure 10 herein). In some embodiments, camera module 4 includes a camera housing or enclosure of a high thermally conductive material, such as a material having a minimum thermal conductivity of 200 watts per meter Kelvin (W/mK), so that heat produced at the bottom of camera module 4 (such as during use of the camera) is conducted forward, away from the bottom of the enclosure and towards the top of the enclosure. This may prevent the bottom (e.g., rear portion) of module 4 from heating to a high temperature, components of device 1 or a surface of front cover 5 near or touching the bottom of module 4, by conducting heat rearward in the device (e.g., forward, away from the bottom of module 4). That is, more heat is transferred forward through and to the front portion of the module; and less heat is transferred rearward from the bottom of the module and towards cover 5.

Figure 2A:
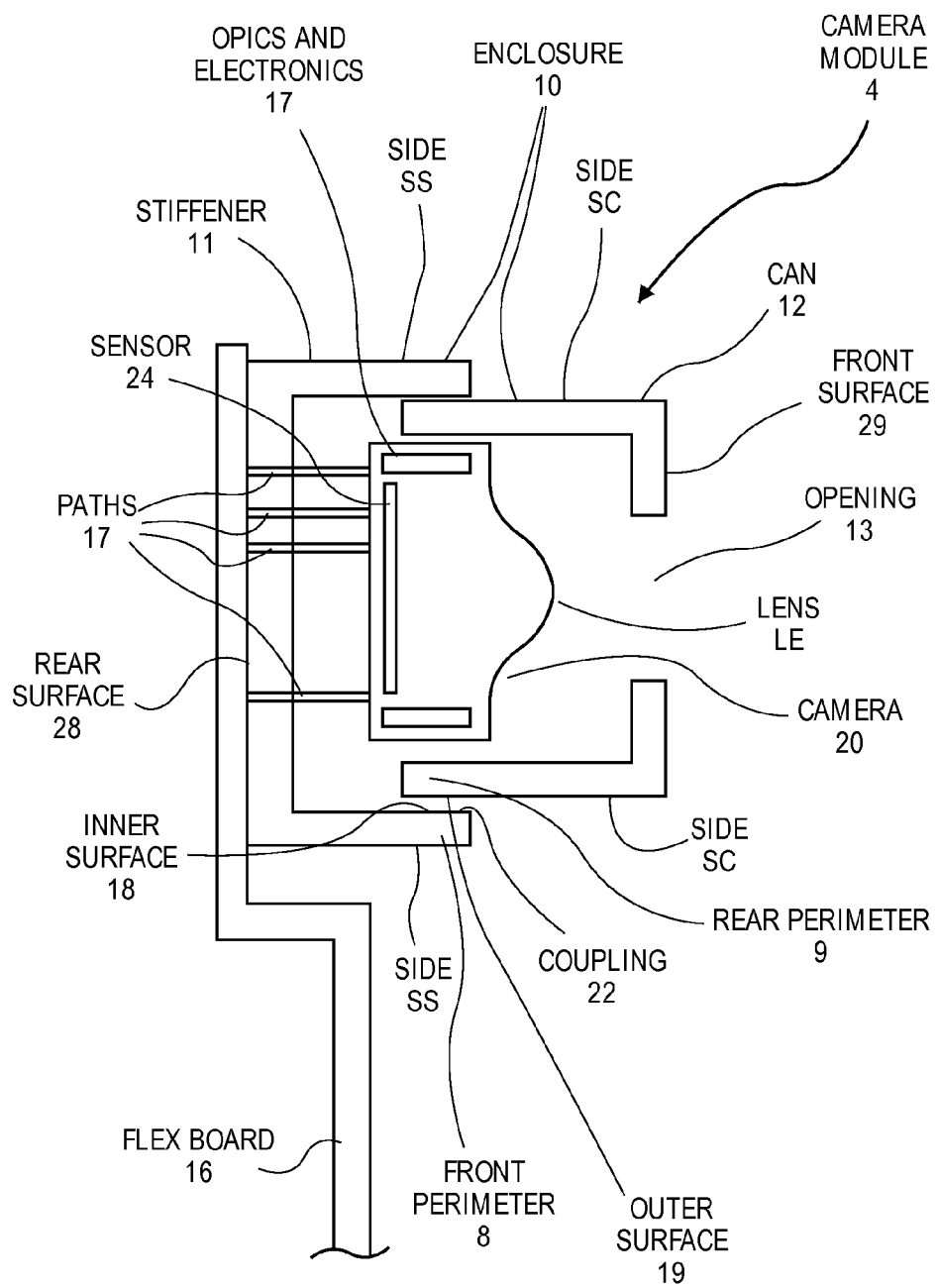
FIG. 2A shows a side cross-sectional view of embodiments of portions of a camera module with a highly thermally conductive camera enclosure.

FIG. 2A shows a side cross-sectional view of embodiments of portions of camera module 4 with a thermally conductive camera enclosure 10. FIG. 2A shows camera module (e.g., assembly) 4 including camera enclosure 10 that is or has (1) rear housing or "stiffener" 11; and (2) front housing or "can" 12. Can 12 has front can opening 13 in can front surface 29, through which camera 20 can take images (e.g., still or video images). Opening 13 or the front of module 4 may be covered by camera cover 3 (e.g., not shown in FIG. 2A, but shown in FIGS. 1, 2B and 6). Enclosure 10 may have at least one dimension that is smaller than 20 millimeters (mm). In some cases, enclosure 10 has a width W of between 5 and 15 mm; a length L of between 4 and 15 mm; and/or a height H of between 2 and 11 mm (e.g., see FIG. 4B).

FIG. 2A shows module 4 oriented with front portion 21 facing (e.g., extending, disposed or oriented) towards front direction F; and rear portion 23 facing towards rear direction R. Module 4 oriented with front portion 21 facing towards front direction F; and rear portion 23 facing towards rear direction R.

Stiffener 11 is shown having sides SS extending forward from rear surface 28, such as to front perimeter 8. Sides SS may extend between or connect surface 28 and perimeter 8. Rear surface 28 may be a lower or bottom surface of stiffener 11. Sides SS may be attached to or bend up from surface 28. In some cases, side SS bend forward from a perimeter of rear surface 28 of the stiffener and form perimeter 8. A top view of stiffener 11 may show surface 28 having a shape and area; and sides SS extending upwards from surface 28 to enclose on all sides, a volume above the area. Perimeter 8 may be or include upper, front or top portions of sides SS. In some cases, perimeter 8 may be a perimeter having the same shape as the perimeter of the area of surface 28. In some cases, the shape of perimeter 8 is different that than of shape of perimeter of the area of surface 28.

Can 12 is shown having opening 13 in surface 2, and sides SC extending rearward from surface 29, such as to rear perimeter. Sides SC may extend between or connect surface 29 and perimeter 9. Front surface 29 may be an upper to top surface of can 12. Sides SC may be attached to or bend down from surface 29. In some cases, side SC bend rearward from a perimeter of front surface 29 of the can and form perimeter 9. Perimeter 9 may be or include lower, rear or bottom portions of sides SC. A top view of can 12 may show surface 29 having a shape and area; and sides SC extending downwards from surface 29 to enclose on all sides, a volume below the area. In some cases, perimeter 9 may be a perimeter having the same shape as the perimeter of the area of surface 29. In some cases, the shape of perimeter 9 is different that than of shape of perimeter of the area of surface 29. Additional descriptions of embodiments of perimeters 8 and 9 are provided further below.

In FIG. 2A, sides SS are shown having inner surface 18 attached to (e.g., physically coupled to by coupling 22, or touching) outer surface 19 of sides SC. It can be appreciated, that in other cases, sides SS may have an outer surface attached to (e.g., physically coupled to or touching) an inner surface sides SC. In some cases, the attachment is or forms coupling 22.

FIG. 2A shows camera 20 located within the camera enclosure 10, having a front portion with lens LE, and a rear portion with comprising an image sensor 24. Camera 20 also includes optics and electronics 17. Flex board 16 is shown coupled to the back of rear surface 28 of stiffener 11. Electronic and optical paths P (e.g., electronic wires, conductive paths or connections; and optical fibers or connections) are shown connecting Electronic and optical paths of board 16 to those of camera 20. The camera rear portion is coupled to rear surface 28 of the stiffener and the camera front portion extends towards opening 13 in the front surface 29 of the can.

Figure 2B:
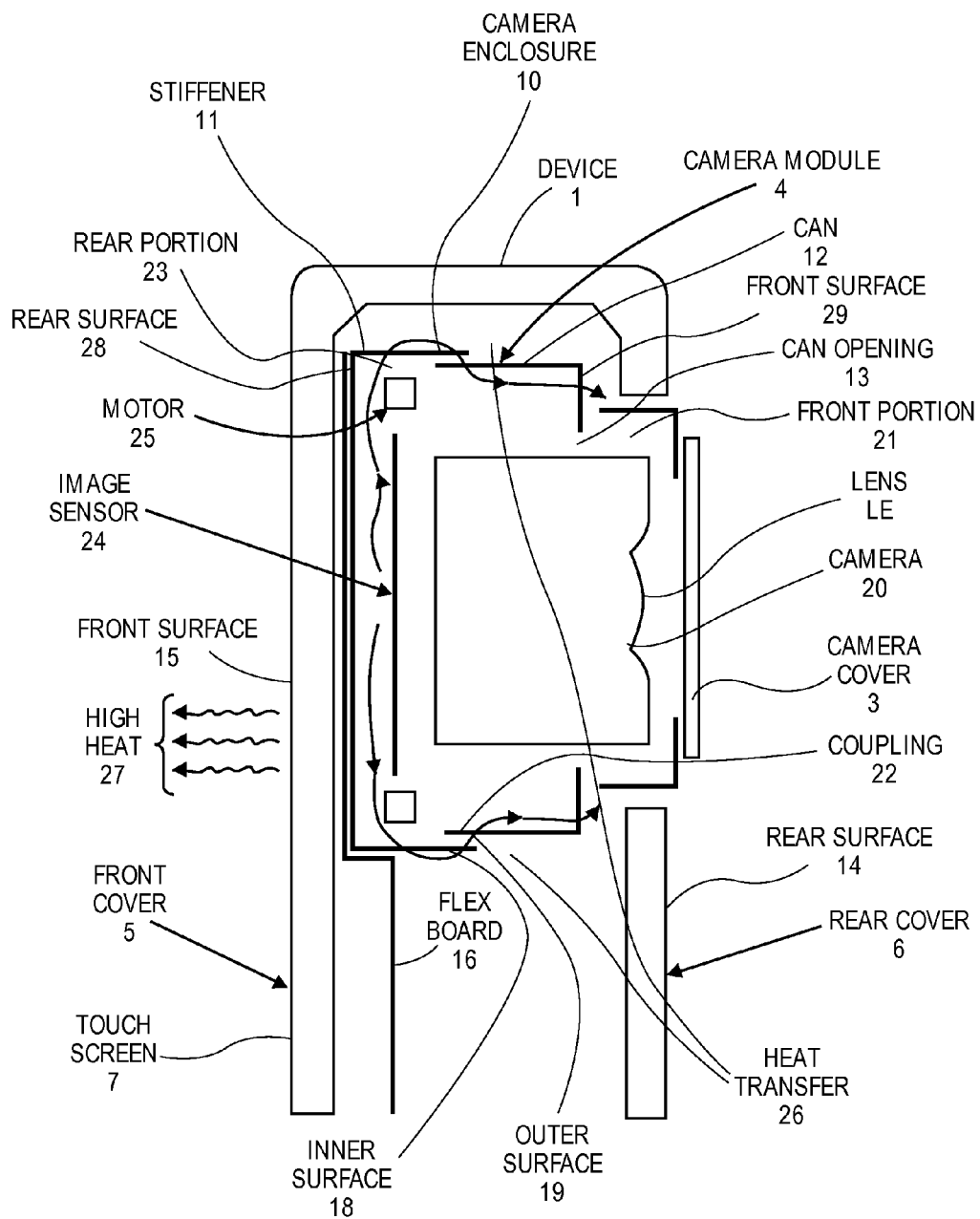
FIG. 2B shows a side cross-sectional view of embodiments of a portion of an electronic device having a camera module with a highly thermally conductive camera enclosure.

FIG. 2B shows a side cross-sectional view of embodiments of a portion of electronic device 1 having camera module 4 with a thermally conductive camera enclosure 10. FIG. 2B shows module 4 including camera enclosure 10, stiffener 11 and can 12 with front can opening 13. Opening 13 or the front of module 4 is shown covered by camera cover 3. In some cases, cover 3 is a transparent plastic or glass through which camera 20 takes images.

Figures 4A, 4B:
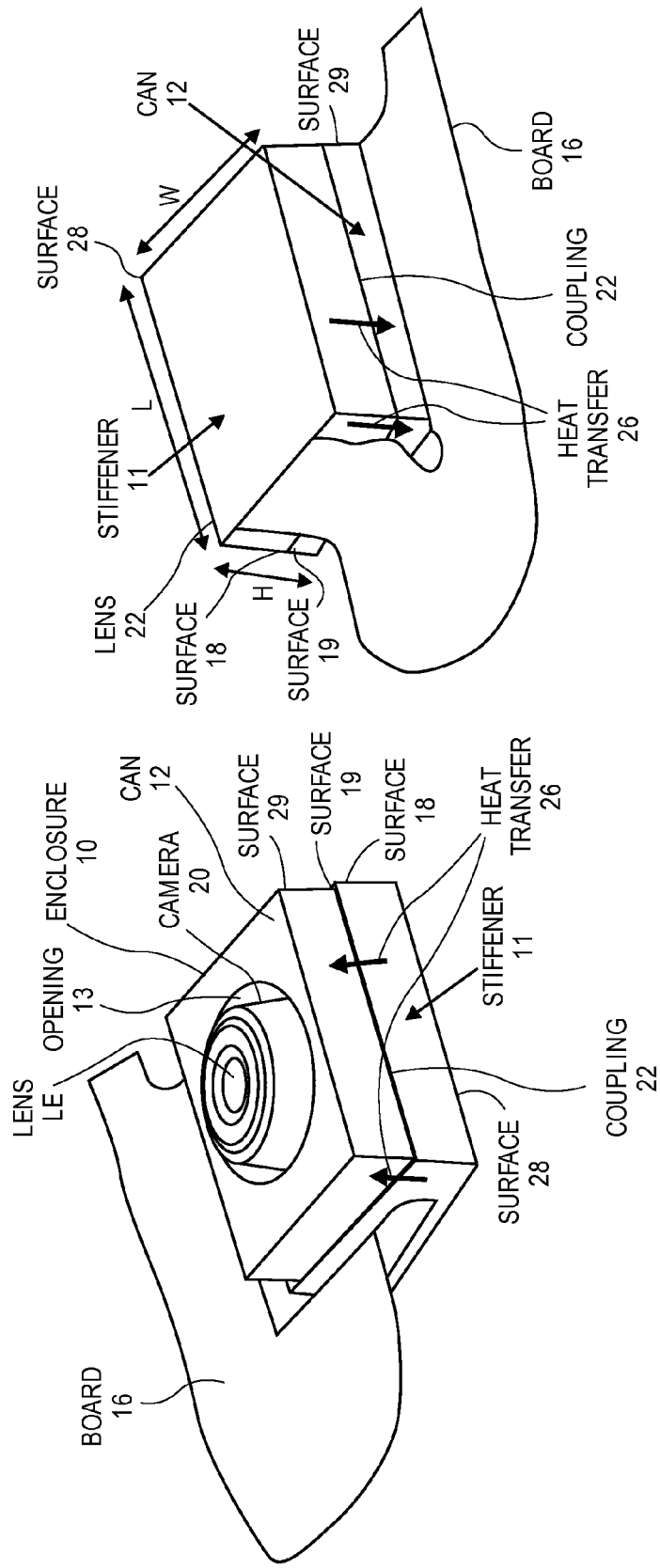
FIG. 4A shows a top perspective view of embodiments of a camera module having a highly thermally conductive camera enclosure.
FIG. 4B shows a bottom perspective view of embodiments of a camera module having a highly thermally conductive camera enclosure.

In some cases, stiffener 11 provides a bottom or lower housing upon which to mount the camera and/or a "flex cable" (e.g., a flexible cable or flex board 16 having electronic wires, optical paths, and/or signal lines) attached to the camera (e.g., see FIGS. 4A-B). It may function as a "stiffener" below the flex cable (e.g., and prior to coupling the can to the stiffener). In some cases, stiffener 11 (e.g., rear surface 28 and sides SS) provides electromagnetic (EM) shield for the camera (e.g., to shield other components of device 1 from EM fields produced by operation of camera 20), provides structural support for flexible board/cable 16, acts as a reinforced module for the camera, provides additional stiffness with the flex for the camera, reduces delamination between the flex and the camera, and/or provides support for handling the camera (e.g., during assembly of device 1). In some cases, can 12 (e.g., front surface 29 and sides SC) provides a top or upper housing to hold the camera between the top of the can (e.g., front surface 29) and the bottom of the stiffener (e.g., rear surface 28) or the top of cable 16 (e.g., see FIGS. 4A-B).

According to embodiments, stiffener 11 is attached to or coupled to can 12. In some cases the attachment is of sides SS to SC; surface 19 to 18; or stiffener 11 to can 12. In some cases, sides SC of can 12 are attached or coupled to sides SS of stiffener 11. This may optionally include attaching rear perimeter 9 to sides SS and front perimeter 8 to sides SC. In some cases, surface 19 of can 12 is attached to surface 18 of stiffener 11. In some cases there may be other components between surfaces 19 and 18. In some cases, the attachment is of the upper part of the stiffener to the lower part of the can. In either case, there may be an embodiment of stiffener 11 that does not have or excludes side surfaces SS, and perimeter 8 of the can is directly attached or coupled by coupling 22 to the top of surface 28.

The attachment of the stiffener to the can may include or represent high thermally conductive coupling 22 that conducts heat between the stiffener (e.g., from sides SS or surface 18) and the can (e.g., to sides SC or surface 19). In some cases, this attachment is a high thermally conductive coupling 22 that conducts heat from the stiffener (e.g., from sides SS or surface 18) to the can (e.g., to sides SC or surface 19) in the forward direction. This conduction or transfer may occur during or over a period of time when the stiffener is heated to a temperature higher than that of the can, which may be during use of camera.

In some cases, the attachment region between the stiffener and can is or has relatively low thermal conductance (e.g., where sides SC of can 12 are attached or coupled to sides SS). However since the contribution to the total conductance by the attachment region between them is small, it has a relatively negligible effect on the total thermal conductance between the stiffener and can (e.g., between sides SC and sides SS). In some cases, the individual component thermal conductance is $(k*A/L)$, where k is the thermal conductance (e.g., a thermal conductivity constant or measure) of the component; A is the area across which the conductance occurs; and L is the length in the direction of conductance (e.g., forward). For the attachment region between the stiffener and can, k may be the thermal conductivity of the attachment region (e.g., such as k of an adhesive between sides SS and SC); A may be the area across the attachment region (e.g., the area defined in directions H×L and H×W shown in FIG. 4A-B of the overlap of surfaces of sides SC with sides SS; or an adhesive between those surfaces); and L is the length of the direction of conductance in the attachment region (e.g., the length sideways defined in directions from the stiffener side (e.g., surface 18) through the attachment (e.g., adhesive) and to the can side (e.g., surface 19)). That is, the attachment region conduction direction L may be 90-degrees to directions H×L and H×W shown in FIG. 4A-B.

In this case, although "k" may be low for the attachment region between the stiffener and can, L is very small compared to the stiffener and can length (e.g. compared to height H shown in FIG. 4A-B). Thus, one benefit of having a high thermally conductive can and stiffener material provides a large thermal benefit to transfer thermal energy from the stiffener (e.g., sides SS), forward, towards the can (e.g., to sides SC), and eventually to the product rear (e.g., to surface 29 or cover 6), regardless of whether "k" (e.g., the thermal conductance) is low for the attachment region between the stiffener and can. In some cases, k for the attachment region is low, medium or high thermal conductance (e.g., it does not matter since the overall thermal conductance for coupling 22 is high due to A and L). In some cases, k for the attachment region is low. In some cases it is medium or low thermal conductance.

In some cases, the attachment region between the stiffener and can is an adhesive at that interface or between opposing surfaces (e.g., surfaces 18 and 19) of sides SS and SC that has a k as noted above. In some cases, the attachment region is an adhesive, an adhesive tape, a glue, a bond, a mechanical mating (e.g., friction mating), an anchoring, a solder, weld, an indexing, "snap" attachment, or other attachment sides SS to SC; surface 19 to 18; or stiffener 11 to can 12. In some cases, the attachment region is a known attachment for such a can and stiffener.

In some cases, coupling 22 includes or provides a high thermally conductive attachment between the can (e.g., sides SC, and optionally perimeter 9) and the stiffener (e.g., sides SS, and optionally perimeter 8). In some case, the thermal conductivity of coupling 22 is at least as great as the thermal conductivity of the material of the can or of the stiffener. In some case, the thermal conductivity of coupling 22 is within 5 or 10 percent of the thermal conductivity of the material of the can or of the stiffener. In some case, the thermal conductivity of coupling 22 is between 70 and 90 percent of the thermal conductivity of the material of the can or of the stiffener. In some case, the thermal conductivity of the coupling 22 (or the attachment) of sides SC (e.g., the lower portion) of the can to sides SS (e.g., the upper portion) of the stiffener has a conductivity at least 80 percent of the conductivity of the stiffener or of the cap to enhance (or promote) heat transfer away from sides SS of the stiffener and to sides SC of the can. In some cases, coupling 22 has a minimum thermal conductivity of 160 W/mK. In some cases, coupling 22 has a minimum thermal conductivity of 200 W/mK.

FIG. 2B shows camera 20 located (e.g., mounted or disposed) within the camera enclosure 10, and has camera front portion 21 with lens LE. Portion 21 (and lens LE) are shown extending through opening 13. In some cases, portion 21 (and lens LE) are do not extend through opening 13, but are oriented (e.g., disposed or facing) towards opening 13.

Camera 20 has camera rear portion 23 with image sensor 24 and motor driver 25. In some cases, portion 23 does not include driver 25. In some cases portion 23 includes more than one driver 25. In some case, driver 25 represents one or more motor drivers for voice coil motor coils of the camera.

Rear portion 23 of the camera is coupled to or directly attached (e.g., touching) stiffener 11. In some cases a lower (e.g., rear or bottom) surface of portion 23 is directly attached to an upper (e.g., front or top) surface of rear surface 28 of stiffener 11. In some cases, the attachment includes or provides a high thermally conductive attachment between rear potion 23 and stiffener 11 (or surface 28), such as described for the high thermally conductive attachment between can 12 and stiffener 11. In some cases, flex board 16 is between portion 23 and stiffener 11 (or surface 28) (e.g., see FIGS. 4A-B).

This attachment may be made using adhesive, glue, bonding, soldering, welding, indexing, "snap" attachment, or other known attachment for such a can and stiffener. In some cases, the attachment is glued using a known adhesive or attachment for attaching a camera to a housing or stiffener.

Front surface 29 (e.g., front of can 12), lens LE and opening 13 are shown oriented towards an inner surface of rear cover 6. According to embodiments, front surface 29 or module front portion 21 are oriented towards, coupled to, or attached directly to an inside surface of rear outer cover 6 of device 1. In some cases, camera front portion 21 is coupled to or directly attached to the inner surface of rear cover 6. In some cases, surface 29 is coupled or directly attached to the inner surface of rear cover 6. In each of these cases, the attachment may include or provide a high thermally conductive attachment between potion 21 or surface 29 and the inner surface of rear cover 6, such as described for the high thermally conductive attachment between can 12 and stiffener 11.

In some cases, front portion 21 or surface 29 are free standing, not mounted or not directly attached to an inside surface of rear outer cover 6. They may be attached to another component of device 1, but heat may still be transferred forward, away from stiffener 11 and/or to cover 6 as described herein due to use of materials described herein for enclosure 10 to avoid creating a high temperature at cover 5. This transfer may occur during or over a period of time when the stiffener is heated to a temperature higher than that of the can, which may be during use of camera.

Rear surface 28 (e.g., rear, bottom or lower surface of stiffener 11) is shown mounted on or attached to a top surface of flex board 16. In some cases, part of board 16 is disposed above surface 28 of stiffener 11, instead of being below the stiffener (e.g., below surface 28) (e.g., see FIGS. 4A-B). In these cases, part of board 16 may be coupled to or directly attached to a top surface of surface 28. Flex board 16 may represent a flexible cable, circuit board, electronic "ribbon" cable, and the like upon which module 4 may be mounted. It may provide electronic (and optionally optical) signals to and from module 4 (e.g., from a processor of device 1). It may also provide physical support for module 4. In other cases, board 16 may not exist and the signals may be provided by other structure. In each of these cases, surface 28 (e.g., rear of stiffener 11) and flex board 16 (if it exists) are shown oriented towards an inner surface of front cover 5. In some cases, surface 28 (e.g., rear of stiffener 11) or flex board 16 (if it is below stiffener 11) are located adjacent to (e.g., within 1 or 2 millimeter (mm) above) or are touching an inner surface of front cover 5.

According to embodiments, surface 28 or module rear portion 23 are oriented towards, coupled to, or attached directly to an inside surface (possibly through board 16) of front outer cover 5 of device 1. In some cases, board 16 is coupled to or directly attached to the inner surface of front cover 5. In some cases, surface 28 is coupled or directly attached to the inner surface of front cover 5. In each of these cases, the attachment may include or provide a high thermally conductive attachment between board 16 or surface 28 and the inner surface of front cover 5, such as described for the high thermally conductive attachment between can 12 and stiffener 11.

In some cases, surface 28 or board 16 are free standing, not mounted or not directly attached to an inside surface of front outer cover 5. They may be attached to another component of device 1, but heat may still be transferred forward, away from cover 5 as described herein due to use of materials described herein for enclosure 10 to avoid creating a high temperature at cover 5. This transfer may occur during or over a period of time when the stiffener is heated to a temperature higher than that of the can, which may be during use of camera.

FIG. 2B shows high heat 27 radiating from front surface 15 of cover 5. It also shows rear surface 14 of cover 6. It shows heat transfer 26 in a forward direction (e.g., towards front F of module 4) from cover 5 towards cover 6. Transfer 26 may be a transfer forward, away from surface 28 or stiffener 11 and towards surface 29 or can 12. In some embodiments, camera module 4 includes camera housing or enclosure 10 of a high thermally conductive material (and optionally having coupling 22) so that heat produced at rear portion 23 of camera 20 is conducted through the rear surface 28 of the enclosure and towards the front surface 29 of the enclosure 10, so that the bottom of module 4 does not heat to, or takes substantially longer in time to heat to a high temperature, components of device 1 or surface 15 of front cover 5 near the bottom of module 4. This may be because transfer 26 causes more heat to be transferred forward towards surface 29; and less heat to be transferred rearward toward cover 5 or heat 27. These transfers may occur during a period of time when the stiffener is heated to a temperature higher than that of the can, which may be during use of camera 20.

In some cases, stiffener 11 and can 12 are formed of materials that not only meet the other (e.g., structural) requirements for enclosure 10 (e.g., yield strength and elongation thresholds) but are also highly thermally conductive materials, such as materials having a minimum thermal conductivity of 200 watts per meter Kelvin (W/mK). In some cases, stiffener 11 and can 12 are the same highly thermally conductive material. In some cases, stiffener 11 and can 12 are different highly thermally conductive materials.

Due to the high thermally conductivity of the material(s), heat produced at the bottom of the camera 20 (e.g., at portion 23) is conducted forward (e.g., frontwards or towards Front F) (e.g., see transfer 26) away from surface 28, through stiffener 11, and towards surface 29 at the top of can 12 so that surface 28 at bottom of the stiffener 11 does not heat to a high temperature, components of device 1 or surface 15 near the bottom of the stiffener. This may include heat being conducted forward (e.g., see transfer 26), away from surface 28, through sides SS to perimeter 8; from sides SS through coupling 22 to sides SC; and through sides SC to surface 29. In some cases, one or more high thermally conductive materials are used to form the stiffener and cap, thus, enhancing heat transfer (1) forward, away from the camera rear portion; (2) forward, through the stiffener (e.g., through surface 28 and sides SS) and to the can (e.g., to sides SC, such as through coupling 2); (3) forward, away from the stiffener (e.g., away from sides SC) through sides SC of the can; and (4) forward, from the sides of the can SC to the front surface 29 of the can. Thus, selecting one or more high thermally conductive materials to be used to form the stiffener and cap increases (e.g., enhances or promotes) the amount of heat transferred from surface 28 or the rear portion of enclosure 10 to surface 29 or the front portion of enclosure 10 where the transferred heat 26 may not create a high temperature or may be more efficiently distributed (e.g., across cover 6).

This transfer may cause the thermal energy to be more evenly or homogenously distributed through components and covers of device 1. In some cases it may cause more or most of the transferred thermal energy 26 to be distributed to rear cover 6 of the device (e.g., instead of to front cover 5). By transferring the heat 26, front surface 15 that is near the rear portion of the camera module will not reach or will take substantially longer to reach a high temperature. These transfers may occur during a period of time when the stiffener is heated to a temperature higher than that of the can, which may be during use of camera 20.

According to some embodiments, enclosure materials for cap 12 and stiffener 11 are selected to have a substantially higher thermal conductivity than for materials having low or medium conductivity as noted below. In some cases, manufacturability and structural integrity may also be a factor in the selection of the materials. In some cases, the materials are selected to not only meet the other requirements for the enclosure (e.g., yield strength and elongation thresholds) but to also be highly thermally conductive materials. In some cases, the materials are selected (1) to have a substantially higher (e.g., between 8 and 12 times higher) thermal conductivity than for materials having low or medium conductivity as noted below; (2) to be capable of being folded (e.g., bent) and deep drawn to the requirements for forming the shape of the cap and stiffener; and (3) to have a proven structural integrity to survive reliability testing (e.g., such as by enclosure 10 of the material surviving a selected compressive load test without excessive deformation). In some cases, the materials are selected to maintain the structural load requirements (e.g., having material strength—e.g., yield strength of at least 450 MPa) of enclosure 10, such as during pinch, squeeze in pressure, and drawing (e.g., deep drawing). This may include having load requirements during impact of device such as onto a floor or surface if device 1 is dropped by a user. In some cases, any two, three or more of the above cases (e.g., sentences) are combined.

According to some embodiments, the stiffener is formed of a first Copper alloy material having a high yield strength, a low elongation, and a high thermal conductivity, such as a minimum thermal conductivity of 200 watts per meter Kelvin (W/mK), in order to enhance (or promote) heat transfer (1) forward, away from the camera rear portion, and (2) forward, through the stiffener and to the can. In some cases, sides SS, rear surface 28 and front perimeter 8 are formed of the same material. In some cases, they are different materials but have the same yield strength, elongation, and thermal conductivity. In some cases, they are different materials but have each of a yield strength, elongation, and thermal conductivity within 15 percent of each other. In some cases, they are different materials but have each of yield strength, elongation, and thermal conductivity within 10 percent of those listed above. In some cases, they are different materials but each have thermal conductivity within 10 percent of that listed above.

According to some embodiments, the can is formed of a second Copper alloy material having a medium yield strength, a medium elongation, and a high thermal conductivity, such as a minimum thermal conductivity of 200 watts per meter Kelvin (W/mK), in order to enhance heat transfer away from the stiffener to a lower (e.g., rear) portion of the can; and from the lower (e.g., rear) portion of the can to the upper portion of the can. This may include enhancing heat transfer (1) forward, away from the stiffener through the sides of the can, and (2) forward, from the sides of the can to the front surface of the can. These transfers may occur during a period of time when the stiffener is heated to a temperature higher than that of the can, which may be during use of camera 20.

In some cases, sides SC, front surface 29 and rear perimeter 9 formed of the same material. In some cases, they are different materials but have the same yield strength, elongation, and thermal conductivity. In some cases, they are different materials but have each of a yield strength, elongation, and thermal conductivity within 15 percent of each other. In some cases, they are different materials but have each of yield strength, elongation, and thermal conductivity within 10 percent of those listed above. In some cases, they are different materials but each have thermal conductivity within 10 percent of that listed above. In some cases, embodiments of this paragraph and the paragraph above (e.g., sentences) are combined.

In some cases, the stiffener is formed of a Copper alloy (e.g., known as "NKC4419-1/4H" or "C64800" and having a thermal conductivity of k=260 W/m-K). In some cases, this material is considered to have a high yield strength and a low elongation. In some cases, the can is formed of a Copper alloy (e.g., known as "NKC4419-H" and having a thermal conductivity of k=260 W/m-K). In some cases, this material is considered to have a medium yield strength and a medium elongation. In some cases, this material is considered to have a lower yield strength, and a higher elongation than the material noted above for the stiffener. It can be appreciated that copper alloy NKC4419 (1/4H or H) has substantially higher thermal conductivity than "US305" (e.g., 260 v. 16 W/m-K), and it can be folded and deep drawn to the requirements and has proven structural integrity to survive reliability testing for enclosure 10. In some cases, the above materials are considered to be high thermally conductive materials.

In some cases, the can is made (e.g., completely) of a material (once formed into the can) having a minimum thermal conductivity of 200 watts per meter Kelvin (W/mK), a yield strength of between 450 and 500 megapascal (MPa), and a minimum allowable elongation of 10% (e.g., a percent of the length of the material that the material may be pulled before it shatters or permanently deforms). In some cases, the can material is a fully hardened copper alloy material having the thermal conductivity and elongation characteristics above. In some cases, the stiffener is made (e.g., completely) of a material (once formed into the stiffener) having a minimum thermal conductivity of 200 W/mK, a minimum yield strength of 600 MPa, and a minimum allowable elongation of 2%. In some cases, the stiffener material is a fully hardened copper alloy material having these thermal conductivity, yield strength and elongation characteristics. In some cases, any two, three or four of the above cases (e.g., descriptions in the above sentences) are combined.

In some cases, the can material is a copper alloy including (1) copper silver and silicon; (2) Copper 97.66% Cobalt 1.9% and Silicon 0.44%; (3) Chromium 0.09% Phosphorus 0.5% Cobalt 1-3.0% and Copper rest %; or (4) a 1/4 hardened copper cobalt silicon alloy. In some cases, the stiffener material a copper alloy including (1) copper silver and silicon; (2) Copper 97.66% Cobalt 1.9% and Silicon 0.44%; (3) Chromium 0.09% Phosphorus 0.5% Cobalt 1-3.0% and Copper rest %; or (4) a fully hardened copper cobalt silicon alloy. In some cases, the two above cases (e.g., sentences) are combined. In some cases, the above materials are considered to be high thermally conductive materials.

In some embodiments, the material of stiffener 11 and cap 12 are or includes a non-ferromagnetic or a non-ferrous material. In some cases, the stiffener and can are each materials that have a "Low" magnetic permittivity, such as one of less than 1.1 Henries meter. In some cases the permittivity is less than 1.5 Henries meter. In some cases, it is less than 2.5 Henries meter.

Figure 5:
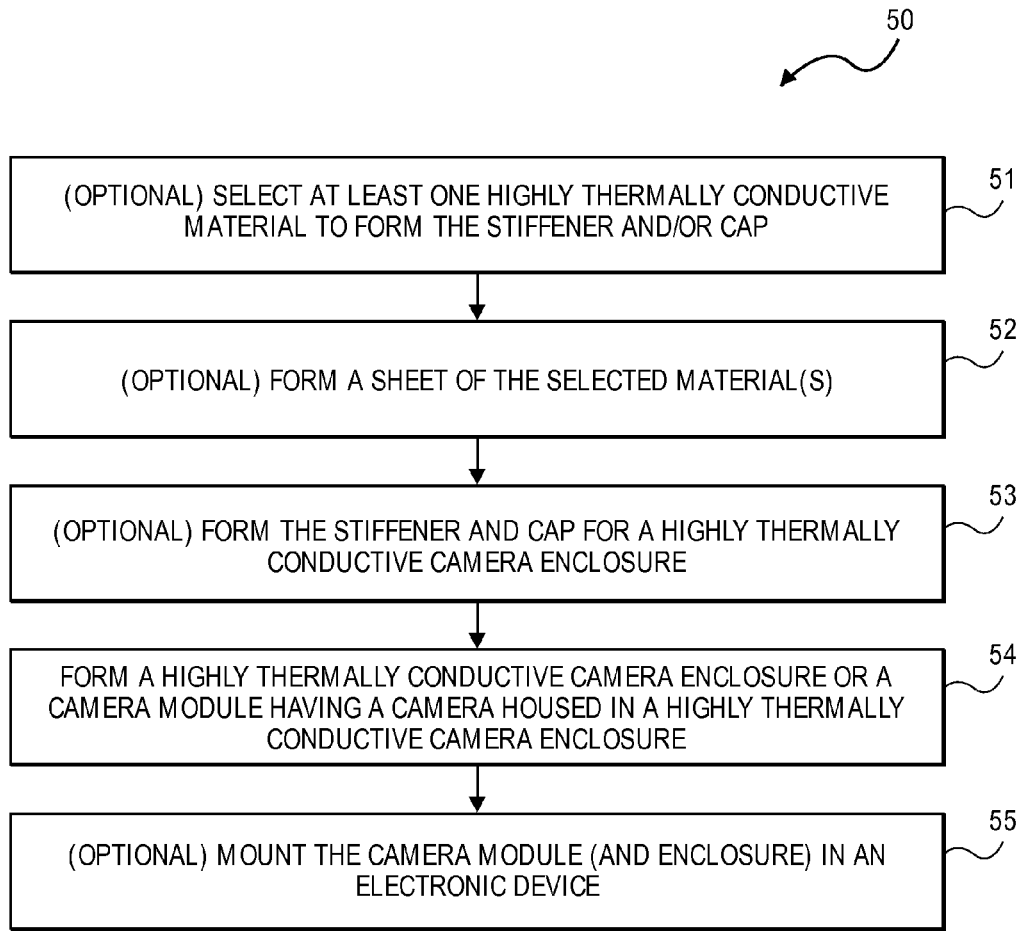
FIG. 5 shows a flow diagram of an example process for manufacturing a micro camera module or mobile device that includes embodiments a camera module having a highly thermally conductive camera enclosure.

In some cases, the stiffener and can are each made of materials that are easily physically formable, such as by folding, drawing, deep drawing, rolling, pressure forming into a shape (e.g., as shown herein) over a mold, and/or forming into a shape by "punch" forming (e.g., see block 53 of FIG. 5). In some cases they are each of a material and formed into enclosure 10 such that the enclosure is resistive to compression of between surface 28 (e.g., the lower portion) of the stiffener and surface 29 (e.g., the upper portion) of the can (e.g., by having a yield strength of at least 450 MPa).

It can be appreciated that forming the can and stiffener of the materials noted above (e.g., such as a stiffener of NKC4419-1/4H and a can of NKC4419-H) can be unexpected as compared to other selections of materials. One reason for this can be that the materials above could only be selected after trying dozens of metal and alloy materials. One reason for this can be that the materials above could only be selected after testing many different combinations of metal alloys to find the particular two that are quite effective in meeting all of specified requirements for the camera module. Such requirements may include manufacturability, structural integrity (e.g., yield strength and elongation thresholds), and high thermal conductivity. In some cases, the requirement are (1) to have a substantially higher (e.g., between 8 and 12 times higher) thermal conductivity than for materials having low or medium conductivity; (2) to be capable of being folded (e.g., bent) and deep drawn to the requirements for forming the shape of the cap and stiffener; and (3) to have a proven structural integrity to survive reliability testing (e.g., such as by enclosure 10 of the material surviving a selected compressive load test without excessive deformation). In some cases, the requirements include being able to maintain the structural load requirements (e.g., having material strength—e.g., yield strength of at least 450 MPa) of enclosure 10. In some cases, the unexpected results include identifying a combination of the copper alloy materials noted above for forming the can and stiffener (e.g., such as a stiffener of NKC4419-1/4H and a can of NKC4419-H) as one combination of numerous available materials for those skilled in the art to try.

The embodiments of the invention herein may be contrasted against using enclosure materials for cap 12 and stiffener 11 that are selected mainly or only based on manufacturability and structural integrity (e.g., and not on having high thermal conductivity). In those cases, the enclosure may have a bottom housing or "stiffener" (e.g., a housing upon which the bottom of the camera or image sensor are mounted or attached) formed of a Phosphor Bronze alloy 1/2 Hard (e.g., known as "C5191") and having a thermal conductivity of k=67 W/m-K with adequate strength to be a stiffener and that can be deep drawn. This material does not have high thermal conductivity as desired by embodiments herein (e.g., and may be considered a low or medium thermally conductive material).

The embodiments of the invention herein may be contrasted against the enclosure having a top housing or "can" (the housing having an opening towards which the camera lens is aimed, through which the lens extends, or through which the camera takes images) formed of stainless steel alloy (e.g., known as "US305" and having a thermal conductivity of k=16 W/m-K), or of a Nickel Silver alloy (e.g., known as "C7521" and having a thermal conductivity of k=33 W/m-K). These materials do not have high thermal conductivity as desired by embodiments herein (e.g., and may be considered a low or medium thermally conductive materials).

The embodiments of the invention herein may also be contrasted against having (1) the stiffener and/or can of Phosphor Bronze (e.g., known as C5191), 1/2 Hard, which has adequate strength and can be deep drawn, but which does not have a high thermal conductivity (only at 67 W/m-K); (2) the stiffener and/or can are Brass (e.g., known as C2801) 1/2 Hard, which has inadequate strength, can be deep drawn, and has medium thermal conductivity (only at 117 W/m-K); (3) the stiffener and/or can are Molybdenum, which cannot be deep drawn or fabricated into the stiffener or can, has adequate strength, and has medium thermal conductivity (only at 138 W/m-K). These materials do not have high thermal conductivity as desired by embodiments herein (e.g., and may be considered a low or medium thermally conductive materials).

In some cases, low thermally conductive represents a material having a thermal conductivity of k<50 W/m-K. In some cases it is between 10 and 50 W/m-K. In some cases, medium thermally conductive represents a material having a thermal conductivity of k between 15 and 150 W/m-K. In some cases, low or medium thermally conductive represents a material having a thermal conductivity of k<200 W/m-K. In some cases it is between 50 and 200 W/m-K.

In some cases, high (e.g., highly) thermally conductive represents a material having a thermal conductivity of k>200 W/m-K. In some cases it is between 200 and 300 W/m-K. In some cases it is between 250 and 300 W/m-K.

In some cases, a high yield strength is a minimum yield strength of 600 MPa. In some cases it is between 600 MPa and 800 MPa. In some cases, a medium yield strength is a maximum yield strength of 600 MPa. In some cases it is between 400 and 500 MPa.

In some cases, a low elongation is a minimum allowable elongation of 2%. In some cases it is between 2% and 10%. In some cases, a medium elongation is a minimum allowable elongation of 10%. In some cases it is between 10% and 20%.

In some cases, the stiffener has a high yield strength and the can has a medium a high yield strength. In some cases, the stiffener has a low elongation and the can has a medium elongation. In some cases, the can has a yield strength smaller than that of the stiffener, and an elongation greater than that of the stiffener.

In some cases, the stiffener and can are each materials that have a "low" electrical conductivity, such as by having a resistance of greater than 1K Ohms from the rear of the stiffener to the top of the can. In some cases the resistance is greater than 10K Ohms. In some cases, it is greater than 50K Ohms or greater than 100K Ohms.

In some cases, the stiffener and can are each materials that have a "very high" spring constant, such as by requiring a force of 4 pounds between the rear of the stiffener to the top of the can, to cause a compression of 20% the length from the rear of the stiffener to the top of the can. In some cases the spring constant requires a force of 10 pounds. In some cases, it requires greater than 20 pounds.

In some cases, stiffener 11 and can 12 are different high thermally conductive same materials. In some cases, they are the same material. In some cases, they are different materials but have each of a yield strength, elongation, and thermal conductivity within 10 percent of those described for embodiments. In some cases, they are different materials but each have thermal conductivity within 10 percent of that described herein.

In some cases, perimeter 8 includes a vertical (e.g., up and down with respect to FIG. 2A) projection, lip, outcropping, flange or vertical surface, such as a flat portion wider than the vertical thickness of sides SS. This projection may project upward, downward, or both. The sides or rear surface of this projection may be coupled to sides SC or perimeter 9 (which may have a projection as noted below).

In some cases, perimeter 9 includes a vertical (e.g., up and down with respect to FIG. 2A) projection, lip, outcropping, flange or vertical surface, such as a flat portion wider than the vertical thickness of sides SC. This projection may project upward, downward, or both. The sides or front surface of this projection may be coupled to sides SS or perimeter 8 (which may have a projection as noted below).

Perimeters 8 and 9 (e.g., formed by sides SS and SC, respectively) may be square or rectangular shaped perimeters from a top perspective view (e.g., FIG. 4) around the front end of stiffener 11 and rear end of can 12. In some cases, perimeters 8 and 9 may have a width (e.g., cross section length from above, or thickness) of between 1 and 5 percent of the distance of width W or length L of enclosure 10. In some cases, instead of a square or rectangular perimeter, perimeters 8 and 9 may be perimeters that have the shape of a circle, ring, oval, a triangle, rhombus, trapezoid, or a polygon.

Thus, embodiments described herein use a material for the camera enclosure that has a thermal conductivity (e.g., that is a high thermally conductive material such as a Copper alloy) for the camera enclosure to adequately reduce temperature at both the image sensor and the product front surface 5, in part, by transferring the thermal energy forward, away from the front surface 5 of the device (e.g., from the rear portion of the camera module or enclosure) and towards or to the rear of the device (e.g., to the front portion of the camera module or enclosure), thus transferring less heat rearward. This transfer may occur without increasing the thickness of device 1, without adding heat transfer material below module 4, and without adding components or material (e.g., thermally conducting straps) to device 1.

This transfer may cause the thermal energy to be more evenly or homogenously distributed forward, through components and covers of the device. In some cases it may cause more or most of the transferred thermal energy to be distributed forward, to a rear cover of the device (e.g., instead of to the front cover of the device). By transferring the heat forward, a front surface 5 that is near the rear portion of the camera module will not reach or will take substantially longer to reach a high temperature, because less heat is transferred rearward to surface 5. These transfers may occur during or over a period of time when the stiffener is heated to a temperature higher than that of the can, which may be during use of camera.

Figure 3:
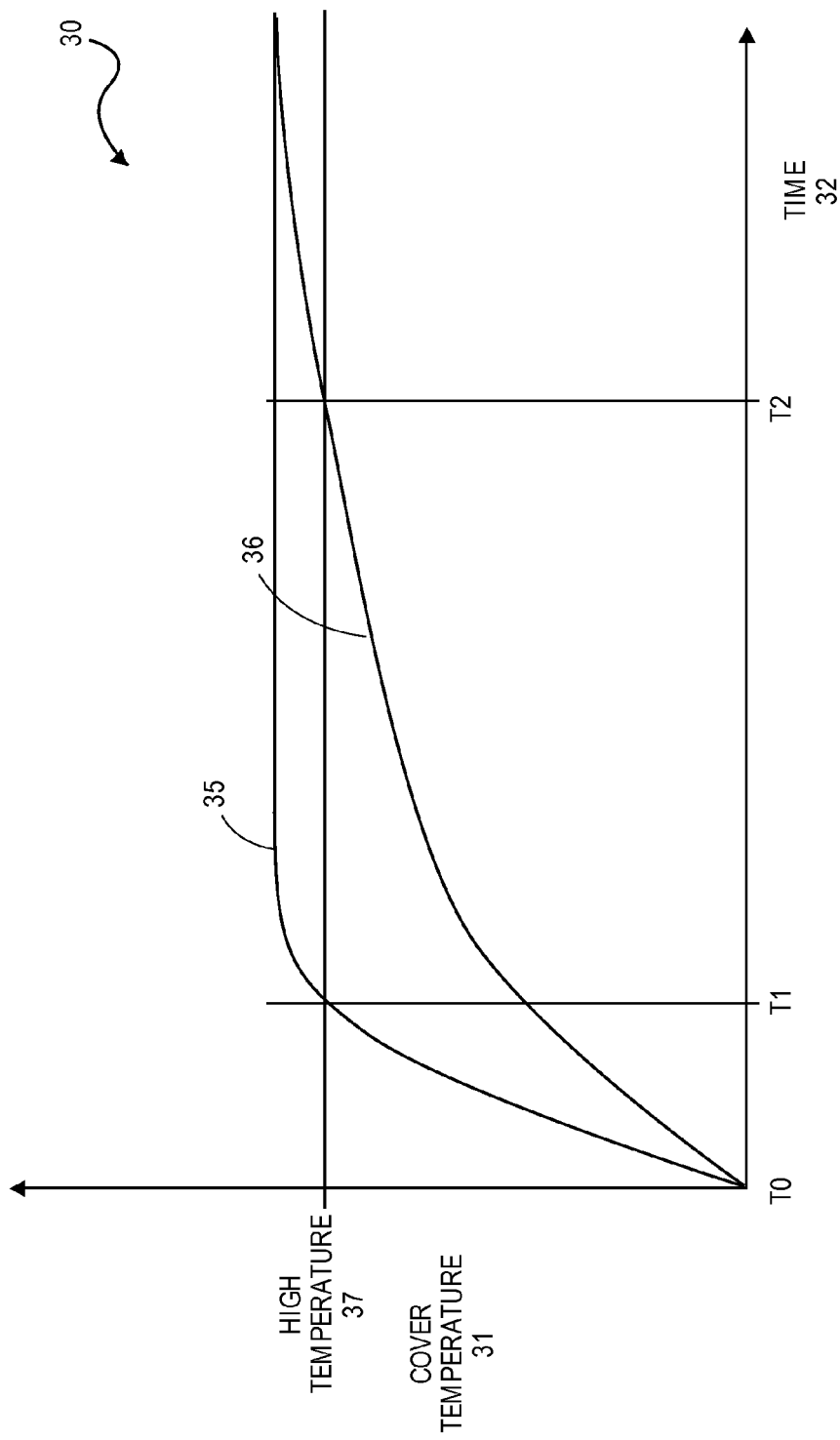
FIG. 3 shows a plot of temperature of a front cover of two electronic devices versus time for embodiments of a camera module having different thermally conductive camera enclosures.

FIG. 3 shows plot 30 of temperature of a front cover 31 of two electronic devices versus time 32 during use of camera 20 for embodiments of a camera enclosure 10 having different thermally conductive camera enclosures. These temperatures may occur during a time when the stiffener is heated to a temperature higher than that of the can, which may be during use of camera 20. The use may begin at time T0; and may be taking images in a periodic, video, rapid shot, sports shot, "heavy" use or frequent use of sensor 24 with respect to time 32. Plot 30 shows temperature curves 35 and 36 of a front cover of two electronic devices versus time for two camera modules having two different thermally conductive camera enclosures.

Temperature curve 35 may represent a curve for the temperature of front cover 5 or surface 15 electronic device 1 versus time for a camera enclosure having a low or medium thermally conductive camera enclosures. Temperature curve 35 reaches high temperature 37 at time T1. In some cases, time T1 represents a time of between 1 and 5 minutes from time T0.

Temperature curve 36 may represent a curve for the temperature of front cover 5 or surface 15 electronic device 1 versus time for a camera enclosure 10 having a highly thermally conductive camera enclosures. Temperature curve 36 reaches high temperature 37 at time T2. In some cases, time T2 represents a time of between 10 and 50 minutes from time T0. In some cases, time T2 is "substantially longer" than T1. This may mean T2 is between 5 and 15 times longer than T1 from time T0. This may mean T2 is between 8 and 12 times longer than T1 from time T0. It can be appreciated that curve 36 can be obtained by using materials for enclosure 10 that not only meet the other requirements for enclosure 10 (e.g., yield strength and elongation thresholds) but that are also highly thermally conductive materials; as to where curve 35 may be for materials that meet the other requirements, but are low or medium thermally conductive.

FIG. 4A shows a top perspective view of embodiments of a camera module having a highly thermally conductive camera enclosure. FIG. 4B shows a bottom perspective view of embodiments of a camera module having a highly thermally conductive camera enclosure. FIGS. 4A-B show module 4 physically and electronically attached to board 16. They also show high thermally conductive stiffener 11, high thermally conductive can 12, and coupling 22 of high thermally conductive enclosure 10. They show rear surface 28 and front surface 29. FIG. 4A shows lens LE of camera 20 extending through opening 13 of can 12 and above surface 29.

FIGS. 4A-B also show heat transfer 26, such as from stiffener 11 towards or to can 12 (or from surface 28 towards or to surface 29). Transfers 26 may occur during or over period of time when the stiffener is heated to a temperature higher than that of the can, which may be during use of camera 20. FIGS. 4A-B also shows surfaces 19 and 18 of enclosure 10, which may be attached by a high thermally conductive coupling or attachment such as described herein, for the attachment between stiffener 11 and can 12.

FIGS. 4A-B show embodiments where board 16 extends above or within the bottom surface of stiffener 11. In this case, stiffener 11 may be behind or below board 16. In some cases, board 16 includes flexible cable or board having electrical signal lines (e.g., wires, traces and the like) extending, disposed in, or located within enclosure 10 between the top of the bottom surface of stiffener 11 and a bottom of camera 20 to provide electrical control signals to camera 20 and receive electrical image signals from camera 20.

While stiffener 11 and cap 12 are shown have a rectangular or square side, top and bottom view shapes, other shapes are considered. In some cases, the side, top and/or bottom view shapes may have curved edges, have a curved shape or have a polygon shape. In some cases, the side, top and/or bottom view shapes may be or include a rounded, oval, triangular, circular or bowed shape.

It can be appreciated that in some embodiments, stiffener 11 and cap 12 may represent one single piece of highly thermally conductive material. In some cases, stiffener 11 and cap 12 may represent more than 2 pieces of material. In some cases they may represent 3, 4 or 5 separate, highly thermally coupled pieces of highly thermally conductive materials. In each case, each material may have the high yield strength, a low elongation, and minimum thermal conductivity noted for embodiments. In some cases, they are different materials but have each of a yield strength, elongation, and thermal conductivity within 10 percent of those listed herein. In some cases, they are different materials but each have thermal conductivity within 10 percent of that listed above.

Some embodiments may include sides SS of the stiffener bent forward from a perimeter of rear surface 28 and forming perimeter 8; and sides SC of the can bent rearward from a perimeter of front surface 29 and forming perimeter 9. This may include the stiffener formed of a first Copper Silicon alloy material that increases heat transfer (1) from the rear portion of the camera to a rear surface of the stiffener, (2) forward, from the rear surface of the stiffener, through the sides of the stiffener, and to the front perimeter of the stiffener. This may also include high thermally conductive coupling 22 between sides SS of the stiffener and sides SC of the can that enhances heat transfer from the sides SS and the front perimeter 8 of the stiffener to the sides SC and the rear perimeter 9 of the can. This may also include the can formed of a second Copper Silicon alloy material that enhances heat transfer forward, away from the coupling 22 and the rear perimeter 9 of the can, through the sides SC of the can and to the front surface 29 of the can.

Descriptions herein with respect to FIGS. 1-6 may address heat transfer (e.g., transfer 26 from stiffener 11 and cap 12) during use of camera 20, such as during the camera taking images that cause repetitive, periodic, video, rapid shot, sports shot, "heavy" use and/or frequent use of sensor 24. However, it can be appreciated that a heat transfer (e.g., transfer 26 from stiffener 11 and cap 12) may also occur when camera 20 is not in use. For example, stiffener 11 may be heated by another component of device 1 (e.g., by cover 5 or board 16) to a temperature greater than that of cap 12. In some cases, a heat transfer (e.g., transfer 26 from stiffener 11 and cap 12) may also occur when camera 20 is not in use, due to the materials selected for enclosure 10 (e.g., stiffener 11 and cap 12 and the coupling between them). For example, according to some embodiments, the stiffener is formed of a first Copper alloy material having a high yield strength, a low elongation, and a high thermal conductivity in order to enhance heat transfer away from the rear of the stiffener, through the stiffener and to the can. According to some embodiments, the can is formed of a second Copper alloy material having a medium yield strength, a medium elongation, and a high thermal conductivity, such as having a minimum thermal conductivity of 200 W/mK, in order to enhance heat transfer forward, away from the stiffener (e.g., forward from surface 28) to a lower or rear portion (e.g., to sides SC, such as through coupling 22) of the can; and from the lower or rear portion of the can (e.g., forward through sides SC) to the upper portion (e.g., to surface 29) of the can. In some cases, the two above cases (e.g., sentences) are combined.

FIG. 5 shows a flow diagram of an example process 50 of manufacturing the camera enclosure, module or mobile device that includes embodiments of a camera module having a highly thermally conductive camera enclosure. Process 50 may describe embodiments of manufacturing all or part of enclosure 10, camera module 4 or device 1 that includes embodiments a camera module having a thermally conductive camera enclosure.

Process 50 begins with (Optional) block 51 where at least one highly thermally conductive material is selected to form stiffener 11 and cap 12. This may be selecting from predetermined materials (e.g., from a list or those described herein) that are known or selected to have material characteristics including (1) to have a high thermal conductivity; (2) to be capable of being folded (e.g., bent) and deep drawn to the requirements for forming the cap and stiffener; and (3) to have a proven structural integrity to survive reliability testing. This may include selecting the same or different materials for the stiffener 11 and cap 12 that will have the characteristics above once formed (e.g., folded and drawn) into the stiffener 11 and cap 12. This may include selections of a coppery alloy material(s) based on or that satisfy descriptions herein (e.g., see descriptions for FIGS. 1-4) with respect to requirements for, capabilities of, or selections of materials for the stiffener 11 and cap 12.

Next, at (Optional) block 52, a sheet of the selected material(s) is formed. Block 52 may include folding the selected material(s) to form a sheet or plate of material that will be further formed or "drawn" to form stiffener 11 and cap 12. Here, the selected copper alloy material(s) may be repetitively folded and pressed; or repetitively folded until they have the characteristics noted at block 51, once formed (e.g., drawn) into the stiffener 11 and cap 12. In some cases, this includes hardening or tempering the folded, formed sheets. In some cases, this does not include hardening or tempering the folded, formed sheets. This may include forming a sheet of a copper alloy material(s) based on or that satisfy descriptions herein (e.g., see descriptions for FIGS. 1-4) with respect to requirements for, capabilities of, or selections of materials for the stiffener 11 and cap 12.

Next, at (Optional) block 53, stiffener 11 and cap 12 are formed, such as for a highly thermally conductive camera enclosure 10. Block 53 may include forming the stiffener 11 and cap 12 from the sheets formed in block 52. Block 53 may include "drawing" or "deep drawing" the sheets of material to form stiffener 11 and cap 12. In some cases, the stiffener and can are each formed such as by one or more of drawing, deep drawing, molding, casting, etching, cutting, electroplating, pressure forming over a mold, and/or forming into a shape by "punch" forming the sheets of block 52 into the shapes of stiffener 11 and cap 12 (e.g., as shown herein). Drawing may include a process in which a sheet metal blank (e.g., the sheet of block 52) is radially drawn into a forming die by the mechanical action of a punch. It may thus be a shape transformation process with material retention. The process may be considered "deep" drawing when the depth of the drawn part exceeds its diameter. This may be achieved by redrawing the part through a series of dies. In some cases, stiffener 11 and cap 12 are formed separately, during different manufacturing processes, at different locations or during different periods of time, such as by being formed from different pieces or layers of materials. In some cases, they are formed with all of the differences noted above. Block 53 may include forming surfaces 28 and 29; sides SS and SC; and perimeters 8 and 9.

Here, stiffener 11 and cap 12 are formed may be formed until they have the characteristics described at block 51 for the stiffener 11 and cap 12. This may include forming stiffener 11 and cap 12 based on or that satisfy descriptions herein (e.g., see descriptions for FIGS. 1-4) with respect to requirements for, capabilities of, or selections of materials for the stiffener 11 and cap 12. In some cases, this includes hardening or tempering the formed stiffener 11 and cap 12. In some cases, this does not include such hardening.

Next, at block 54, enclosure 10 is formed, such as to for a highly thermally conductive camera enclosure 10, such as having a minimum thermal conductivity of 200 watts per meter Kelvin (W/mK). Block 54 may include coupling stiffener 11 to cap 12 (e.g., formed at block 53) using or with a highly thermally conductive coupling (e.g., coupling 22) as noted herein. Block 54 may include attaching stiffener 11 to cap 12 as noted herein. Block 54 may include attaching stiffener 11 to cap 12 using coupling 22. Here, enclosure 10 may be formed until it has the characteristics noted at block 51 for stiffener 11 and cap 12. This may include forming enclosure 10; or coupling stiffener 11 to cap 12 based on or that satisfy descriptions herein (e.g., see descriptions for FIGS. 1-4) with respect to requirements for, capabilities of, or selections of materials for enclosure 10; or stiffener 11 and cap 12. In some cases, this includes hardening or tempering the formed enclosure 10. In some cases, this does not include such hardening.

In some cases, block 54 optionally includes mounting camera 20 within or to stiffener 11 prior to coupling stiffener 11 to cap 12. This may include enclosing, mounting or disposing the camera within camera enclosure 10 to form camera module 4. In some cases, block 54 includes mounting camera 20 and board 16 within or to stiffener 11 prior to coupling stiffener 11 to cap 12. In some cases, block 54 includes mounting camera 20 within or to stiffener 11 (and optionally to cap 12) while or during coupling stiffener 11 to cap 12. This may include forming module 4 based on or to satisfy descriptions herein (e.g., see descriptions for FIGS. 1-4) with respect to requirements for, capabilities of, or selections of materials for module 4 (e.g., and enclosure 10, camera 20, stiffener 11 and cap 12).

Next, at (Optional) block 55, module 4 (and enclosure 10) is mounted (e.g., enclosed or disposed in) electronic device 1. Block 55 may include enclosing module 4 in or within device 1, so that camera 20 can take still and/or video images through cover 3 of a scene or objects behind or beyond surface 14, outside of device 1. In some embodiments, block 55 may include enclosing module 4 in a mobile telephone communications device, a smart phone, a personal digital media player, a tablet computer, a notebook computer, and a compact desktop computer. Block 55 is optional and is not performed in some embodiments. This may include mounting module 4 in or within device 1 based on or to satisfy descriptions herein (e.g., see descriptions for FIGS. 1-4) with respect to requirements for, capabilities of, or selections of materials for enclosure 10, module 4, and/or device 1.

In some embodiments, block 55 may include mounting module 4 so that front surface 29 or module front portion 21 are oriented towards, coupled to, or attached directly to inside surface 14 of rear outer cover 6 of device 1. In some embodiments, block 55 may include mounting module 4 so that rear surface 28 or module rear portion 23 are oriented towards, coupled to, or attached directly to inside surface 15 (through board/cable 16) of front outer cover 5 of device 1. In some cases, the two above cases (e.g., sentences) are combined.

According to some embodiments, only block 54 is performed. In some cases, only blocks 51 and 54 are performed. According to some embodiments, only blocks 53-54 are performed. In some cases, only blocks 51-54 or 52-54 are performed. According to some embodiments, only blocks 54-55 are performed. In some cases, all of blocks 51-55 are performed.

Figure 6:
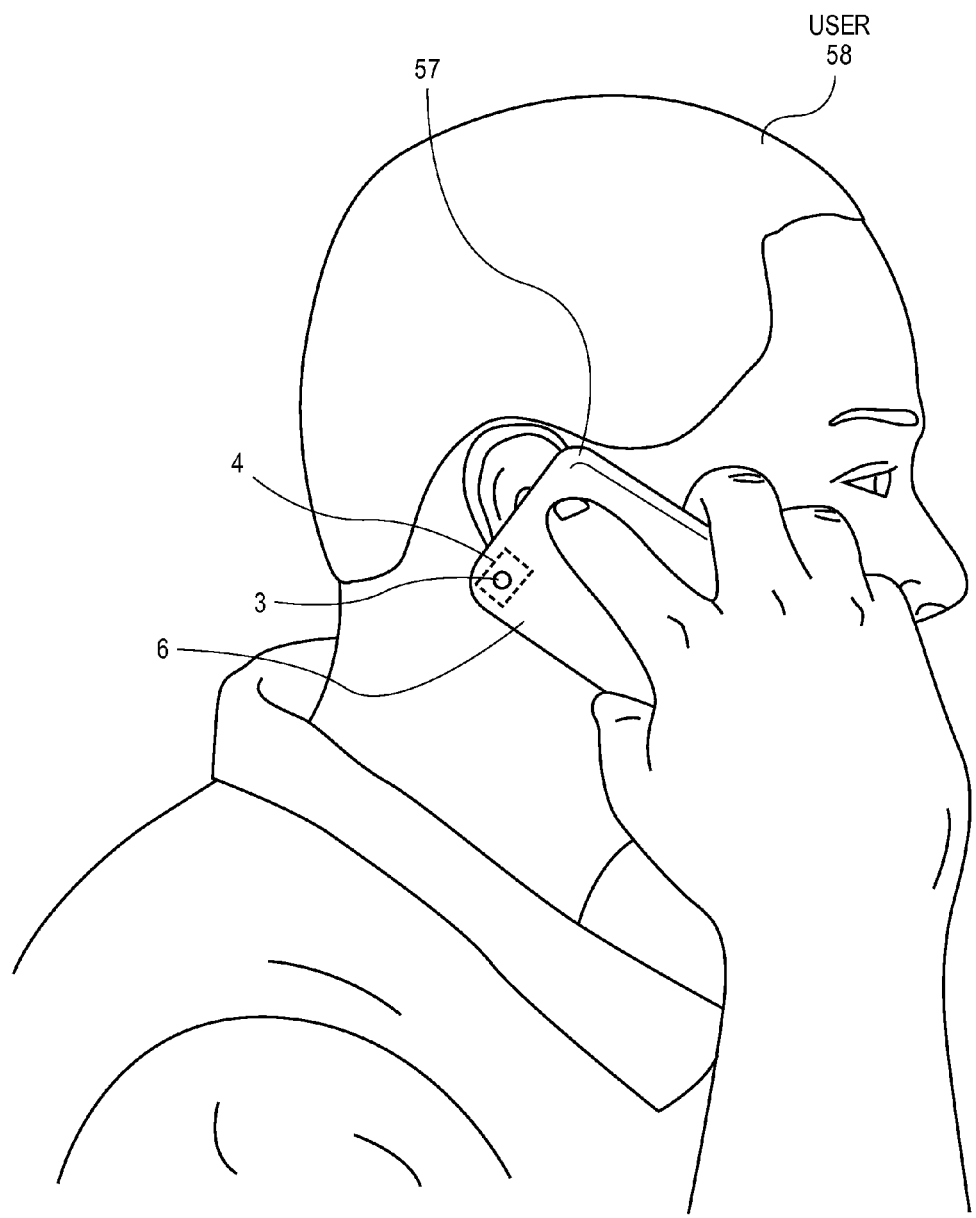
FIG. 6 depicts instances of portable consumer electronics devices in which embodiments of the invention may be implemented.

As explained above, an embodiment of the invention may be housed in a portable device such as a mobile telephone communications device, a smart phone, a personal digital media player, a tablet computer, a notebook computer, and a compact desktop. For example, FIG. 6 depicts instances of portable consumer electronics devices in which embodiments of the invention may be implemented. As seen in FIG. 6, the highly thermally conductive camera enclosure, such as having a minimum thermal conductivity of 200 watts per meter Kelvin (W/mK), that enhances heat transfer between stiffener and cap may included in camera module 4 that is integrated within a consumer electronic device 57 (or device 1) such as a smart phone with which user 58 can conduct a call with a far-end user of another communications device over a wireless communications network. In another example, the highly thermally conductive camera enclosure may be integrated within the housing of tablet computer. These are just examples of where the highly thermally conductive camera enclosure may be used, it is contemplated, however, that the highly thermally conductive camera enclosure may be used with any type of electronic device in which it is desired to have a highly thermally conductive camera enclosure hat enhances heat transfer between stiffener and cap, such as in a lap top computing device, portable headset, watch or glasses.

Thus, embodiments have been described for providing devices, systems and methods for using or manufacturing a camera enclosure, module or mobile device that includes embodiments of a camera module having a highly thermally conductive camera enclosure, such as having a minimum thermal conductivity of 200 watts per meter Kelvin (W/mK), in order to enhance heat transfer between stiffener 11 and cap 12. These embodiments provide benefits such as reducing instance of or avoiding components of module 3, camera 20, device 1 or cover 5 (e.g., proximity sensors, light sensors, motors, sensors, cables, ribbons, flex boards, wires, electrical components, speakers, microphones, processors, batteries, yokes, coils, diaphragms, etc.) or housing (e.g., covers, cover surfaces, walls, bonds, glue, mounting, etc.) exceeding a high temperature or a given temperature at which they may become damaged, inoperative or melt. They also provide benefits such as increasing the amount of time before or avoiding instances of the temperature of outer surfaces of covers (e.g., cover 5 or 6) of the device increasing to a high enough temperature to be uncomfortable, especially when placed against the skin of user 58, such as on the user's face or cheek (e.g., during a telephone call such as depicted in FIG. 6). They also provide benefits such as increasing the amount of time before or avoiding instances of the temperature of outer surfaces of covers (e.g., cover 5 or 6) of the device increasing to a high enough temperature to damage a cover of the device; or damage a material upon which the cover or device is placed. They also provide these benefits without increasing the thickness of device 1 (or device 57) and without adding components or material (e.g., thermally conducting straps) to device 1.

They also provide benefits such as improving power-handling in-camera module by allowing heat to be exchanged (e.g., by transfer 26) from a hotter stiffener to a cooler can. By exchanging the heat, more power can be used to operate the camera, thus allowing for longer use of the camera (e.g., longer continuous use such as for taking video images); and allowing the camera to have more features and options (e.g., for image processing, stabilization, and the like). Also, by exchanging the heat, more power can be used to operate the camera, with less risk of damaging components of the camera or device; or having covers of the device reach a high temperature. In some cases, they may also provide benefits such as reducing the need for letting heat from the camera escape at the product level (e.g., by escaping through cooler cover 6 instead of other components of device 1), thus, allowing the heat to escape in a manner that does not need to impact 1) constraints in product size or 2) constraints in the number of product components, weight, and cost. They provide the benefits of exchanging or transferring this heat without increasing the thickness of device 1, without adding heat transfer material below module 4, and without adding components or material (e.g., thermally conducting straps) to device 1. It can be appreciated that the exchanging or transferring (e.g., conducting heat from the bottom towards the top of module 4) may be counterintuitive as a typical design for cooling of active electronics or circuitry (e.g., module 4) would use a heat sink or other additional heat transfer components located at or that draw heat in a direction below or to the side of the circuitry instead of to the top the circuitry.

To conclude, various aspects of a camera enclosure, module or mobile device that includes embodiments of a camera module having a highly thermally conductive camera enclosure in order to enhance heat transfer between a stiffener and cap of the enclosure have been described. While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although embodiments of the highly thermally conductive camera enclosure, such as having a minimum thermal conductivity of 200 watts per meter Kelvin (W/mK), described in FIGS. 1-6 show one camera module 4, device 1 (or device 57) may include multiple (e.g., 2 or 3) highly thermally conductive camera enclosures or modules 4. This may include a camera module similar to camera module 4 but facing the front surface 5 of the device (e.g., to take images of scenes beyond surface 5), having a highly thermally conductive camera enclosure so that the temperature of surface 14 does not increase to or takes substantially longer to increase to a high temperature. The description is thus to be regarded as illustrative instead of limiting.

What is claimed is:
1. A camera assembly comprising:
a camera enclosure comprising a stiffener and a can;
the stiffener having a rear surface and sides extending forward from the rear surface;
the can having a front surface, an opening in the front surface, and sides extending rearward from the front surface, the sides of the can being coupled to the sides of the stiffener;
a camera located within the camera enclosure, the camera having a front portion comprising a lens; and a rear portion comprising an image sensor;
the camera rear portion being coupled to the rear surface of the stiffener;
the lens in the camera front portion facing the opening in the front surface of the can;
wherein the stiffener is formed of a first Copper alloy material having a yield strength, an elongation, and a minimum thermal conductivity of 200 watts per meter Kelvin (W/mK); and
wherein the can is formed of a second Copper alloy material having a yield strength smaller than that of the stiffener, an elongation greater than that of the stiffener, and a minimum thermal conductivity of 200 W/mK.

2. The assembly of claim 1, wherein the first Copper alloy material is a 1/4 hardened copper alloy material having a minimum yield strength of 600 MPa, and a minimum allowable elongation of 2%; and wherein the second Copper alloy material is a fully hardened copper alloy material having a yield strength of between 450 and 480 MPa, and a minimum allowable elongation of 10%.

3. The assembly of claim 1, wherein the sides of the can are coupled to the sides of the stiffener with a thermally conductive coupling having a thermal conductivity that is at least 80 percent of a thermal conductivity of the stiffener or cap to enhance heat transfer away from the sides of the stiffener and to the sides of the can.

4. The assembly of claim 1, wherein the stiffener is formed of a first Copper alloy material in order to enhance heat transfer (1) forward, away from the camera rear portion, and (2) forward, through the stiffener and to the can; and wherein the can is formed of a second Copper alloy material in order to promote heat transfer (1) forward, away from the stiffener through the sides of the can, and (2) forward, from the sides of the can to the front surface of the can.

5. The assembly of claim 1, wherein the first and second Copper alloy materials have a magnetic permittivity of less than 1.1 Henries meter and are physically formable by deep drawing; and wherein the camera enclosure is resistive to compression between the rear surface of the stiffener and the front surface of the can.

6. The assembly of claim 1, wherein the sides of the stiffener bend forward from a perimeter of the rear surface of the stiffener and form a front perimeter of the stiffener; and wherein the sides of the can bend rearward from a perimeter of the front surface of the can and form a rear perimeter of the can;
wherein the stiffener is formed of a first Copper Silicon alloy material that increases heat transfer (1) from the rear portion of the camera to a rear surface of the stiffener, (2) forward, from the rear surface of the stiffener, through the sides of the stiffener, and to the front perimeter of the stiffener,
wherein a thermally conductive coupling between the sides of the stiffener and the sides of the can promotes heat transfer from the sides and the front perimeter of the stiffener to the sides and the rear perimeter of the can; and
wherein the can is formed of a second Copper Silicon alloy material that promotes heat transfer forward, away from the coupling and the rear perimeter of the can, through the sides of the can and to the front surface of the can.

7. A camera enclosure comprising:
a stiffener and a can;
the stiffener having a rear surface and sides extending forward from the rear surface;
the can having a front surface, an opening in the front surface, and sides extending rearward from the front surface, the sides of the can coupled to the sides of the stiffener;
the rear surface of the stiffener having a location for mounting a camera;
a front surface of the can having an opening to extend a front portion of the camera towards;
wherein the stiffener is formed of a first Copper alloy material having a minimum yield strength of 600 MPa, a minimum allowable elongation of 2%, and a minimum thermal conductivity of 200 watts per meter Kelvin (W/mK); and
wherein the can is formed of a second Copper alloy material having a yield strength of between 400 and 500 MPa, a minimum allowable elongation 10%, and a minimum thermal conductivity of 200 W/mK.

8. The enclosure of claim 7, wherein the first Copper alloy material is a 1/4 hardened copper alloy material and wherein the second Copper alloy material is a fully hardened copper alloy material having a yield strength of between 450 and 480 MPa.

9. The enclosure of claim 7, wherein the stiffener is formed of a first Copper alloy material in order to enhance heat transfer (1) forward, away from the rear surface of the stiffener, and (2) forward, through the stiffener and to the can; and wherein the can is formed of a second Copper alloy material in order to enhance heat transfer (1) forward, away from the stiffener through the sides of the can, and (2) forward, from the sides of the can to the front surface of the can.

10. The enclosure of claim 7, wherein the sides of the can are coupled to the sides of the stiffener with a high thermally conductive coupling having a thermal conductivity that is at least 80 percent of a thermal conductivity of the stiffener or cap to enhance heat transfer away from the sides of the stiffener and to the sides of the can.

11. The enclosure of claim 7, wherein the first and second Copper alloy materials have a magnetic permittivity of less than 1.1 Henries meter and are physically formable by deep drawing; and wherein the camera enclosure is resistive to compression between the rear surface of the stiffener and the front surface of the can.

12. An electronic device comprising:
a camera module having a camera enclosure housing a camera;
the camera enclosure comprising a stiffener and a can;
the stiffener having a rear surface and sides extending forward from the rear surface;
the can having a front surface, an opening in the front surface, and sides extending rearward from the front surface, the sides of the can coupled to the sides of the stiffener;
the camera having a front portion comprising a lens; and a rear portion comprising an image sensor;
the camera rear portion coupled to the rear surface of the stiffener;
the lens in the camera front portion facing the opening in the front surface of the can;
the front surface of the can coupled to a rear cover of the electronic device;
the rear surface of the stiffener coupled to an inner surface of a front cover of the electronic device;
wherein the stiffener is formed of a first Copper alloy material having a yield strength, an elongation, and a minimum thermal conductivity of 200 watts per meter Kelvin (W/mK); and
wherein the can is formed of a second Copper alloy material having a yield strength smaller than that of the stiffener, an elongation greater than that of the stiffener, and a minimum thermal conductivity of 200 W/mK.

13. The device of claim 12, wherein the sides of the can are coupled to the sides of the stiffener with a high thermally conductive coupling having a thermal conductivity that is at least 80 percent of a thermal conductivity of the stiffener or cap to enhance heat transfer away from the sides of the stiffener and to the sides of the can.

14. The device of claim 12, wherein the stiffener is formed of a first Copper alloy material in order to enhance heat transfer (1) forward, away from the camera rear portion and the front cover, and (2) forward, through the stiffener and to the can; and wherein the can is formed of a second Copper alloy material in order to enhance heat transfer (1) forward, away from the stiffener and through the sides of the can, and (2) forward, from the sides of the can to the front surface of the can and the inner surface of the rear cover.

15. The device of claim 12, wherein the rear surface of the stiffener is attached to a flexible board or a flexible ribbon of the electronic device.

16. The device of claim 12, wherein the sides of the stiffener bend forward from a perimeter of the rear surface of the stiffener and form a front perimeter of the stiffener; and wherein the sides of the can bend rearward from a perimeter of the front surface of the can and form a rear perimeter of the can;
 wherein the stiffener is formed of a first Copper Silicon alloy material that increases heat transfer (1) forward, away from the front cover of the device, (2) rearward, from the rear portion of the camera to the rear surface of the stiffener, and (3) forward, from the rear surface of the stiffener, through the sides of the stiffener, and to the front perimeter of the stiffener;
 wherein a high thermally conductive coupling between the sides of the stiffener and the sides of the can promotes heat transfer from the sides and the front perimeter of the stiffener to the sides and the rear perimeter of the can; and
 wherein the can is formed of a second Copper Silicon alloy material that promotes heat transfer (1) forward, away from the coupling and the rear perimeter of the can, through the sides of the can and to the front surface of the can, and (2) forward, from the front surface of the can to the rear cover of the device.

17. A method of forming a camera module comprising:
 mounting a camera on a stiffener of a Copper alloy material having a minimum thermal conductivity of 200 watts per meter Kelvin (W/mK); and
 forming a thermally conductive coupling between sides of the stiffener and sides of a cap, to enclose the camera in a thermally conductive camera module, wherein the cap is formed of a Copper alloy material having a minimum thermal conductivity of 200 W/mK, a yield strength smaller than that of the stiffener, and an elongation greater than that of the stiffener.

18. The method of claim 17, wherein the stiffener is formed of a first Copper alloy material having a high yield strength, a low elongation, and a high thermal conductivity in order to enhance heat transfer forward, away from a rear portion of the camera, through the stiffener and to the can; and
 wherein the can is formed of a second Copper alloy material having a medium yield strength, a medium elongation, and a high thermal conductivity in order to enhance heat transfer (1) forward, away from the stiffener through the sides of the can, and (2) forward, from the sides of the can to the front surface of the can.

19. The method of claim 17, wherein the high thermally conductive coupling has a thermal conductivity that is at least 80 percent of a thermal conductivity of the stiffener or cap to enhance heat transfer away from the sides of the stiffener and to the sides of the can.

20. The method of claim 17, further comprising, prior to mounting the camera:
 selecting at least one highly thermally conductive Copper alloy material to form the stiffener and cap; then
 forming at least one sheet of the selected at least one highly thermally conductive Copper alloy material; then
 forming the stiffener and the cap from the at least one sheet.

21. The method of claim 17, further comprising, after forming a thermally conductive coupling, mounting the camera module in an electronic device.

22. A camera module comprising:
 a camera enclosure comprising a stiffener and a can;
 the stiffener having a rear surface and sides extending forward from the rear surface;
 the can having a front surface, an opening in the front surface, and sides extending rearward from the front surface, the sides of the can being coupled to the sides of the stiffener;
 a camera located within the camera enclosure, the camera having a front portion comprising a lens; and a rear portion comprising an image sensor;
 the camera rear portion being coupled to the rear surface of the stiffener;
 the lens in the camera front portion facing the opening in the front surface of the can;
 wherein the stiffener is formed of NKC4419-1/4H having a high yield strength, a low elongation, and a thermal conductivity of 260 watts per meter Kelvin (W/mK); and
 wherein the can is formed of NKC4419-H having a medium yield strength, a medium elongation, and a thermal conductivity of 260 W/mK.

* * * * *

UNITED STATES PATENT AND TRADEMARK OFFICE
CERTIFICATE OF CORRECTION

PATENT NO. : 9,591,215 B1  
APPLICATION NO. : 14/852336  
DATED : March 7, 2017  
INVENTOR(S) : Scott W. Miller et al.

It is certified that error appears in the above-identified patent and that said Letters Patent is hereby corrected as shown below:

In the Claims

Column 21, Line 3, delete "The assembly of claim 1" and insert -- The camera assembly of claim 1 --

Column 21, Line 10, delete "The assembly of claim 1" and insert -- The camera assembly of claim 1 --

Column 21, Line 16, delete "The assembly of claim 1" and insert -- The camera assembly of claim 1 --

Column 21, Line 24, delete "The assembly of claim 1" and insert -- The camera assembly of claim 1 --

Column 21, Line 30, delete "The assembly of claim 1" and insert -- The camera assembly of claim 1 --

Column 24, Line 2, delete "to the can;" and insert -- to the cap --

Column 24, Line 4, delete "the can" and insert -- the cap --

Column 24, Line 9, delete "from the sides of the can to the front surface of the can" and insert -- from the sides of the cap to a front surface of the cap --

Column 24, Line 10, delete "high"

Column 24, Line 14, delete "can" and insert -- cap --

Signed and Sealed this  
Thirtieth Day of May, 2017

Michelle K. Lee  
*Director of the United States Patent and Trademark Office*